(12) United States Patent
Takemura et al.

(10) Patent No.: US 6,891,736 B2
(45) Date of Patent: May 10, 2005

(54) MULTIPHASE DC/DC CONVERTER

(75) Inventors: Ko Takemura, Kyoto (JP); Kiyotaka Umemoto, Kyoto (JP)

(73) Assignee: Rohm Co., Ltd., Kyoto (JP)

( * ) Notice: Subject to any disclaimer, the term of this patent is extended or adjusted under 35 U.S.C. 154(b) by 108 days.

(21) Appl. No.: 10/342,269

(22) Filed: Jan. 15, 2003

(65) Prior Publication Data

US 2003/0185025 A1 Oct. 2, 2003

(30) Foreign Application Priority Data

Jan. 15, 2002 (JP) .................................... 2002-005695
Jan. 8, 2003 (JP) .................................... 2003-001881

(51) Int. Cl.[7] .............................................. H02M 7/00
(52) U.S. Cl. ........................................ 363/65; 363/71
(58) Field of Search ........................ 363/65, 67, 69, 363/70, 71

(56) References Cited

U.S. PATENT DOCUMENTS 4,920,309 A * 4/1990 Szepesi ...................... 363/65
5,212,630 A * 5/1993 Yamamoto et al. ........... 363/71
6,496,394 B2 * 12/2002 Hanaoka et al. ............. 363/71

* cited by examiner

Primary Examiner—Jessica Han
(74) Attorney, Agent, or Firm—Morgan, Lewis & Bockius LLP

(57) ABSTRACT

In a multiphase DC/DC converter having a plurality of DC/DC converters, to prevent faults in the circuit and the circuit elements constituting it even when the balance of current limiting operation among the individual DC/DC converters is disturbed due to individual and temperature-related variations in the characteristics of the circuit elements, the output currents of the individual DC/DC converters are detected and added together, and are limited individually so that their sum does not exceed a predetermined level of current.

8 Claims, 4 Drawing Sheets

MULTIPHASE DC/DC CONVERTER

BACKGROUND OF THE INVENTION

1. Field of the Invention

The present invention relates to a current limiter circuit in a multiphase DC/DC converter used as a power supply in a personal computer or the like.

2. Description of the Prior Art

As IT (information technology) equipment evolves in functionality, processing speed, and scale, it requires more and more current from power supply circuits. In particular in personal computers, with ever increasing clock speeds of CPUs and with diversification of peripheral devices that are supplied with power from personal computers, it is nowadays common that a load current of the order of a few tens of A to over 100 A is required.

Such personal computers are increasingly operated from built-in batteries rather than from commercially distributed power, and it is difficult for a single DC/DC converter to supply large current as mentioned above. Moreover, to eliminate ripples appearing in the supply voltage, a high-capacitance capacitor or a combination of many capacitors is required, which hampers miniaturization of equipment such as personal computers in which portability matters. Under these circumstances, multiphase DC/DC converters are used that are composed of a plurality of DC/DC converters connected in parallel with one another and operated with their output phases shifted relative to one another so as to produce large current with an improved ripple factor.

On the other hand, as increasingly large current is handled, from the viewpoints of protecting the circuit and securing satisfactory safety for the user, it is also important to detect and prevent as early as possible a short circuit or overcurrent resulting from an accident, fault, or inappropriate operation.

FIG. 4 is a block diagram of an example of a conventional power supply circuit provided with an overcurrent prevention circuit. Of many known types and configurations of circuits for detecting and preventing overcurrent, the power supply circuit shown in FIG. 4 adopts one in which an overcurrent detection circuit detects the voltage appearing across a resistor R in proportion to the current flowing through a load, and the detected voltage is fed to an unillustrated overcurrent protection circuit provided in a DC/DC converter to limit or cut off the current. FIG. 4 shows an example of overcurrent detection and overcurrent prevention in a single DC/DC converter. In a multiphase DC/DC converter provided with a plurality of DC/DC converters connected in parallel with one another, current is detected to prevent overcurrent for each of those DC/DC converters.

As described above, conventionally, even in a multiphase DC/DC converter, current is detected for each DC/DC converter. Thus, when electrical characteristics of individual converters vary due to variations in the characteristics of circuit elements and in temperature, and as a result the current limits set in the individual converters vary, for example, the sum of the load currents actually output from the individual converters may exceed the prescribed sum. This overloads the circuit elements provided on the primary side of the converters or the battery, eventually damaging them or shortening their operating lives. In addition, since current larger than the prescribed level flows through the load. This overloads the load, causing similar problems on this side, too.

On the other hand, when the current limit of one of the converters happens to fall below the prescribed current, overcurrent prevention may be invoked needlessly. This momentarily increases the other converters' share of the load current, adversely affecting the circuit elements provided on the secondary side of the converters which have to temporarily share the load, and thereafter invokes overcurrent protection in all of the converters, leading to an unnecessary shut-off of supply power.

SUMMARY OF THE INVENTION

An object of the present invention is to provide a multiphase DC/DC converter in which not only are the currents output from individual converters limited as practiced conventionally but also, to overcome the problems mentioned above, there is provided a circuit that detects the sum of the load currents output from individual converters to invoke current limiting.

To achieve the above object, according to the present invention, a multiphase DC/DC converter is provided with: a plurality of DC/DC converters whose outputs are connected in parallel with one another; and an overcurrent detection/prevention circuit for detecting and adding together the output currents of the plurality of DC/DC converters and controlling the plurality of DC/DC converters individually so that the sum of the output currents does not exceed a predetermined level of current.

Alternatively, according to the present invention, a multiphase DC/DC converter is provided with: a plurality of DC/DC converters whose outputs are connected in parallel with one another and which each have an overcurrent detection circuit so as to limit the output current thereof according to the output of the overcurrent detection circuit so that the output currents of the individual DC/DC converters do not exceed predetermined currents; and an overcurrent detection/prevention circuit for detecting and adding together the individual output currents and controlling the plurality of DC/DC converters individually so that the sum of the output currents does not exceed a predetermined level of current.

According to the present invention, the individual output currents are detected by detecting voltages obtained through current-to-voltage conversion thereof achieved by means of resistors connected respectively in the output paths of the plurality of DC/DC converters. Moreover, the individual output currents are added together by means of an operational amplifier.

More specifically, the overcurrent detection/prevention circuit is provided with: a plurality of amplifiers for amplifying voltages obtained through current-to-voltage conversion of the individual output currents and outputting the amplified voltages; a plurality of input resistors having one ends thereof connected respectively to the output terminals of the amplifiers and having the other ends thereof connected together at a common node so that currents proportional to the individual output currents flow through the input resistors; an adder having the inverting input terminal thereof connected to the common node of the plurality of resistors and outputting, at the output terminal thereof, a voltage proportional to the sum of input currents individually flowing through the plurality of input resistors; and a comparator for comparing the output voltage of the adder with a predetermined reference voltage. Here, when the output voltage of the adder, which is proportional to the sum of the individual output currents and which is fed to the comparator, is higher than the predetermined reference voltage, the comparator feeds the individual DC/DC converters with a signal for limiting currents to control the individual DC/DC converters so that the sum of the individual output currents does not exceed a predetermined level of current.

Moreover, according to the present invention, the sum of the levels of current at which the overcurrent detection circuits of the individual DC/DC converters detect overcurrent is greater than the predetermined level of current at which overcurrent is detected with respect to the sum of the output currents.

BRIEF DESCRIPTION OF THE DRAWINGS

This and other objects and features of the present invention will become clear from the following description, taken in conjunction with the preferred embodiments with reference to the accompanying drawings in which.

DESCRIPTION OF THE PREFERRED EMBODIMENTS

Figure 1:
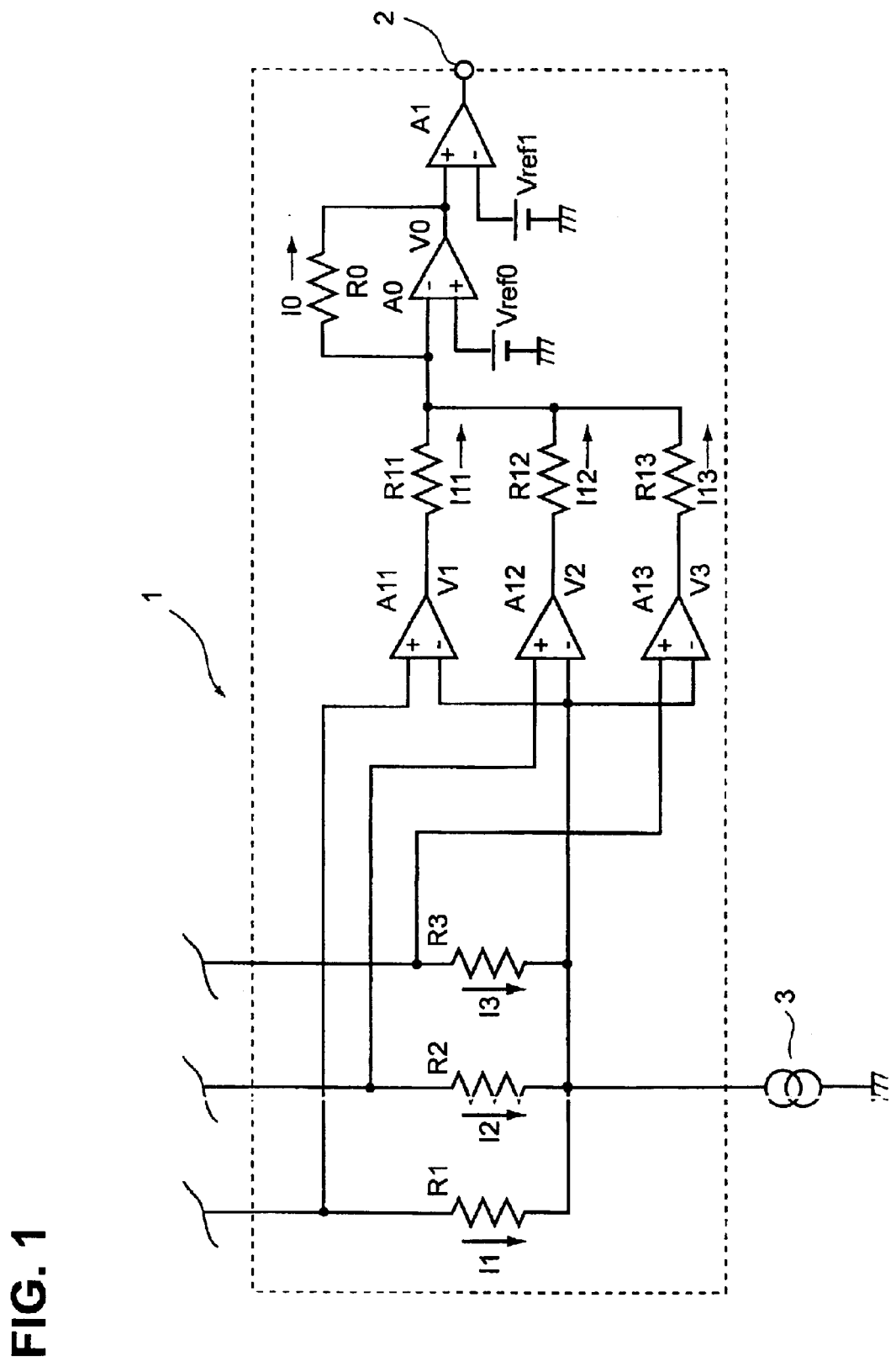
FIG. 1 shows an overcurrent detection/prevention circuit embodying the invention.

Hereinafter, embodiments of the present invention will be described with reference to the drawings. FIG. 1 shows, as one embodiment of the invention, an overcurrent detection/prevention circuit for detecting the sum of load currents.

The overcurrent detection/prevention circuit 1 shown in FIG. 1 has current detection resistors R1, R2, and R3 connected respectively in the output paths of three unillustrated DC/DC converters, and the three output paths are connected, in parallel with one another, to a load 3. The terminal of the current detection resistor R1 opposite to the load is connected to the non-inverting input terminal (+) of an amplifier A11, the terminal of the current detection resistor R2 opposite to the load is connected to the non-inverting input terminal of an amplifier A12, and the terminal of the current detection resistor R3 opposite to the load is connected to the non-inverting input terminal of an amplifier A13. The node at which the current detection resistors R1, R2, and R3 are connected to the load is connected to the inverting input terminals (−) of the amplifiers A11 to A13.

The output terminals of the amplifiers are connected through resistors R11, R12, and R13, respectively, to the inverting input terminal of an operational amplifier A0, and a reference voltage Vref0 is fed to the non-inverting input terminal of the operational amplifier A0. The output of the operational amplifier A0 is fed through a resistor R0 back to its own inverting input terminal, and is also connected to the non-inverting input terminal of a comparator A1. A reference voltage Vref1 is fed to the inverting input terminal of the comparator A1. Though not illustrated, the output obtained from the output terminal 2 of the comparator A1 is fed to the current limiting circuits of the DC/DC converters.

Next, the operation of the overcurrent detection/prevention circuit 1 shown in FIG. 1 will be described. Across the resistors R1 to R3, there appear voltages that are proportional to the currents I1 to I3 that flow through the resistors R1 to R3, respectively. Those voltages are fed respectively to the amplifiers A11 to A13, which all have an amplification factor of Av. Then, the amplifiers A11 to A13 yield output voltages V1, V2, and V3 as follows:

$$V1 = Av \times I1 \times R1$$

$$V2 = Av \times I2 \times R2$$

$$V3 = Av \times I3 \times R3$$

These voltages V1 to V3 cause currents I11, I12, and I13 to flow through the resistors R11, R12, and R13, respectively, and these currents I11, I12, and I13 are added together to produce a current I0 that flows through the resistor R0. That is, the operational amplifier A0 acts as an adder circuit that yields an output voltage V0 as follows:

$$I0 = I1 + I2 + I3$$

$$V0 = R0 \times I0 + Vref0$$
$$= R0 \times (V1/R11 + V2/R12 + V3/R13) + Vref0$$

Thus, the output voltage V0 of the adder circuit is proportional to the sum of the currents I1, I2, and I3. The output voltage V0 is then fed to the non-inverting input terminal of the comparator A1 so that, when it reaches the predetermined reference voltage Vref1, the comparator A1 feeds signals to the unillustrated current limiting circuits of the DC/DC converters to instruct them to limit their currents.

This embodiment deals with a multiphase DC/DC converter having three DC/DC converters connected in parallel with one another. However, the circuit configuration of this embodiment, if modified to include more or less circuit elements or modified otherwise, applies to a combination of any number of DC/DC converters equal to or greater than 2.

Figure 2:
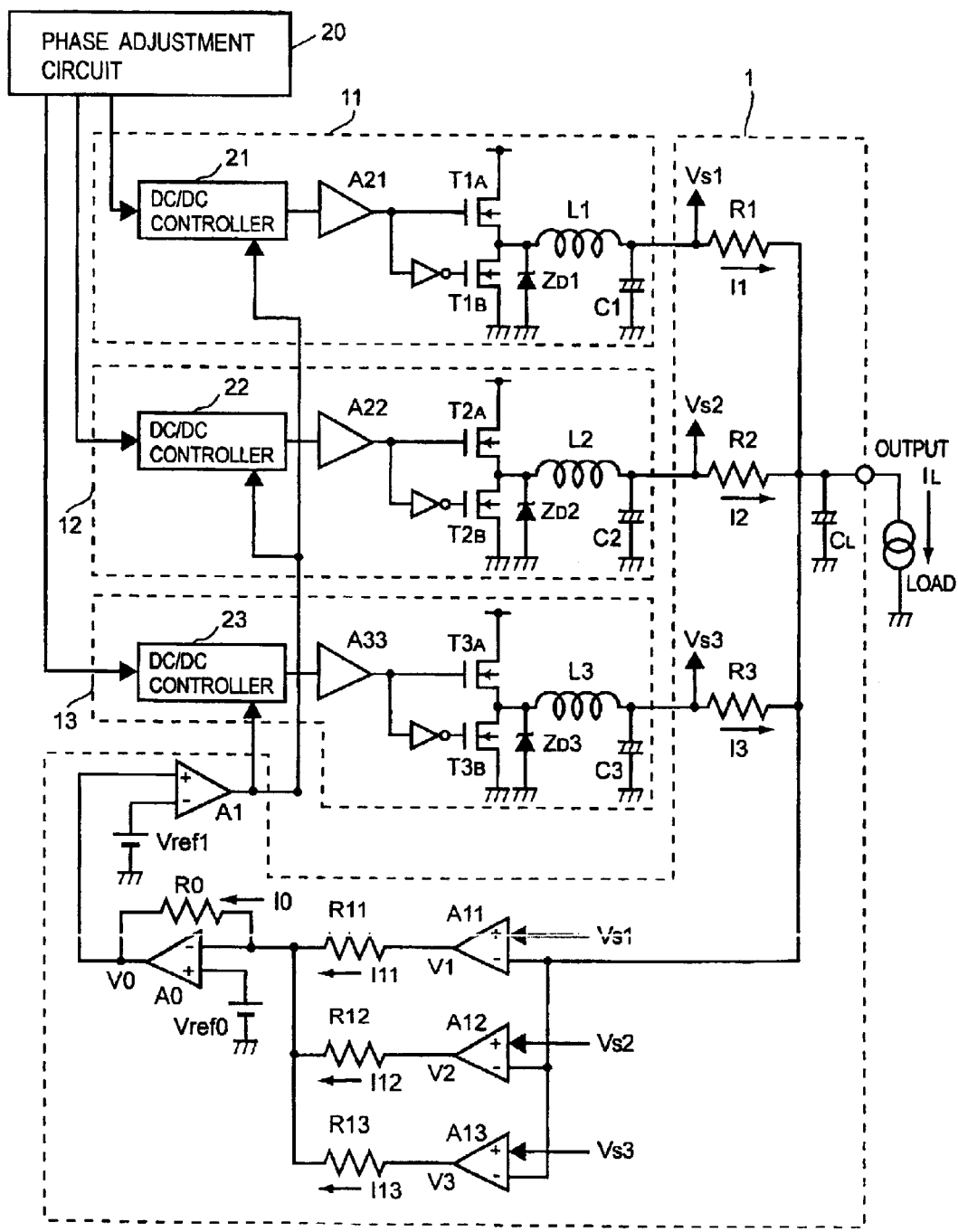
FIG. 2 shows an outline of the circuit configuration of a multiphase DC/DC converter employing the overcurrent detection/prevention circuit of the invention.

Next, an example in which the overcurrent detection/prevention circuit of the invention is applied to a multiphase DC/DC converter will be described in more detail. FIG. 2 shows an outline of the circuit configuration of a multiphase DC/DC converter employing the overcurrent detection/prevention circuit of the invention. In FIG. 2, such circuit elements as are found also in FIG. 1 are identified with the same reference numerals and symbols, and they operate basically in the same manners as in FIG. 1.

The multiphase DC/DC converter shown in FIG. 2 is composed of a phase adjustment circuit 20, DC/DC converters 11, 12, and 13, and an overcurrent detection/prevention circuit 1. The DC/DC converters 11 to 13 are each composed of, if the DC/DC converter 11 is taken up as a representative, a DC/DC controller 21 incorporating a circuit that limits the output current by controlling the width of pulses in the case of a PWM (Pulse Width Modulation) type, a buffer circuit A21, a switching portion consisting of current feeding NMOS transistors T1A and T1B, and an output circuit portion consisting of a Zener diode ZD1, a choke coil L1, and a capacitor C1. The overcurrent detection/prevention circuit 1 is configured as described in detail earlier.

Next, an outline of the operation of the multiphase DC/DC converter shown in FIG. 2 incorporating the overcurrent detection/prevention circuit will be described. It is to be noted that the DC/DC converter 11 will be taken up as a representative to explain the operation of each DC/DC converter. In normal operation, the DC/DC controller 21 outputs a switching control signal, which is fed through the buffer circuit A21 to the transistors T1A to T1B to complementarily turn them on an off so that a current is fed from the output portion to the load.

In the output paths, connected to the load, of the individual DC/DC converters, there are connected current detection resistors R1, R2, and R3, respectively. The overcurrent detection/prevention circuit, including these resistors, operates just as described earlier.

Here, when the current IL flowing through the load, i.e. the sum of the currents I1 to I3 flowing through the individual DC/DC converters, exceeds a predetermined level, the output voltage V0 of the operational amplifier A0, i.e. the voltage fed to the non-inverting input terminal of the comparator A1 exceeds the reference voltage Vref1. When this happens, the comparator A1 feeds its output signal, as a signal for limiting currents, to the DC/DC controllers 21, 22, and 23 provided in the individual DC/DC converters in order to control their output currents by controlling the width of the pulses with which the transistors are turned on and off so that the sum of the currents I1, I2, and I3 becomes equal to the predetermined level. Alternatively, the operation of the circuit may be halted.

This embodiment deals with a multiphase DC/DC converter having three DC/DC converters connected in parallel with one another. However, the circuit configuration of this embodiment, if modified to include more or less circuit elements or modified otherwise, applies to a combination of any number of DC/DC converters equal to or greater than 2. In that case, by configuring the phase adjustment circuit so that the individual DC/DC converters operate with evenly shifted phases, it is possible to improve the ripple factor with respect to the load.

Figure 3:
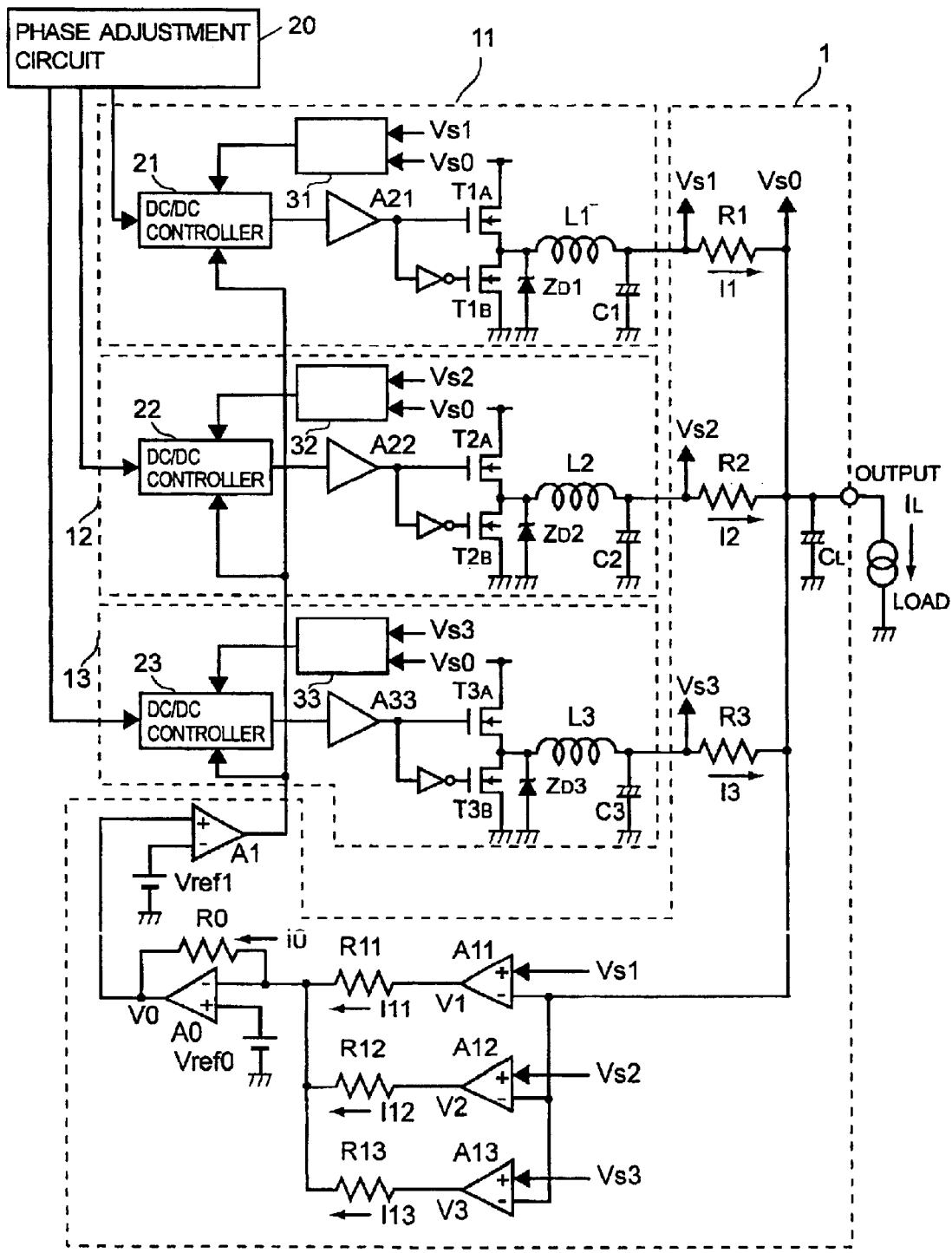
FIG. 3 shows an outline of the circuit configuration of a multiphase DC/DC converter employing the overcurrent detection/prevention circuit of the invention in combination with conventional overcurrent detection circuits provided one for each of the DC/DC converters used.
Figure 4:
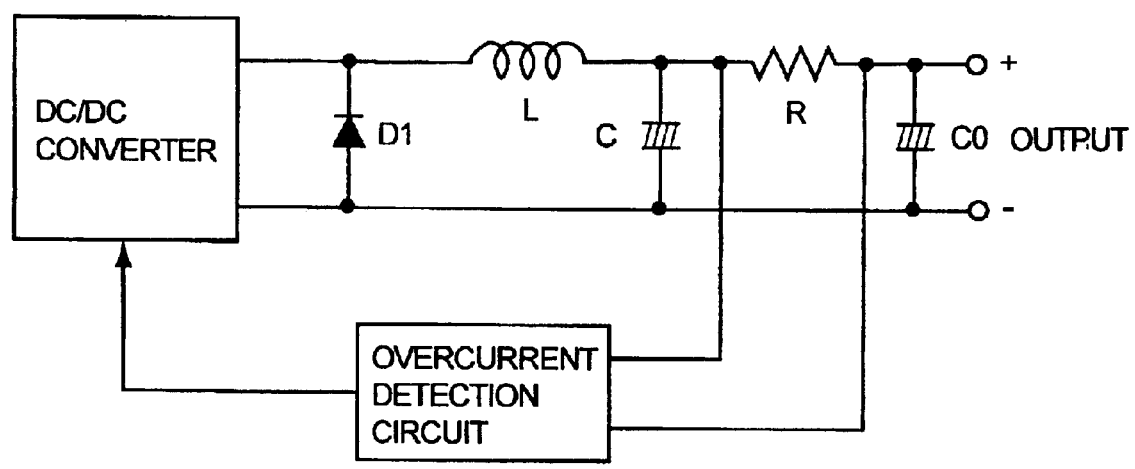
FIG. 4 is a block diagram of a conventional power supply circuit provided with an overcurrent prevention circuit.

FIG. 3 shows an outline of the circuit configuration of a multiphase DC/DC converter employing the overcurrent detection/prevention circuit of the invention in combination with conventional overcurrent detection circuits provided one for each of the DC/DC converters used. In the embodiment described above, current limiting is invoked according to the result of detecting the sum of the currents flowing through the individual DC/DC converters. By contrast, in this embodiment, as shown in FIG. 3, the overcurrent detection/prevention circuit of the invention is combined with conventional overcurrent detection circuits 31 to 33 provided one for each of the DC/DC converters used, and the sum of the current levels set in the individual overcurrent detection circuits 31 to 33 is made greater than the current level set for the sum of the currents in the overcurrent detection/prevention circuit. This helps increase the margin for the current limits of the individual DC/DC converters, and thus makes it possible to prevent the total output current from exceeding a predetermined level while preventing the individual DC/DC converters from unnecessarily invoking their current limiting function. In this way, it is possible to further enhance the safety of the circuit.

The embodiments described above deal with cases in which the currents flowing through the individual DC/DC converters are converted into voltages by means of resistors and are then added together by means of an adder circuit to calculate the total current. However, the circuit for adding together the individual currents and calculating their total may be configured in any other manner than specifically described above. The output circuit portion may be configured in any another manner than specifically shown in FIGS. 2 and 3. For example, the NMOS transistors may be replaced with bipolar transistors; the capacitors C1 to C3 may be omitted; the Zener diodes ZD1 to ZD3 may be replaced with diodes.

As described above, in the current limiting circuit of the invention, and in a multiphase DC/DC converter employing it, even when the electrical characteristics of the individual converters vary due to variations in the characteristics of circuit elements and in temperature, and as a result the current limits set in the individual converters vary, current limiting is performed also according to the sum of the currents of the individual converters. This not only helps prevent overloading the circuit elements provided on the primary side of the converters or the battery, and thus helps prevent damaging them or shortening their operating lives, but also helps prevent overloading the load, and thus helps preventing similar problems on this side.

What is claimed is:

1. A multiphase DC/DC converter, comprising:
    a plurality of DC/DC converters whose outputs are connected in parallel with one another; and
    an overcurrent detection/prevention circuit for detecting and adding together output currents of the plurality of DC/DC converters and controlling the plurality of DC/DC converters individually so that a sum of the output currents does not exceed a predetermined level of current;
    wherein the individual output currents are detected by detecting voltages obtained through current-to-voltage conversion thereof achieved by means of resistors connected respectively in output paths of the plurality of DC/DC converters.

2. A multiphase DC/DC converter, comprising:
    a plurality of DC/DC converters whose outputs are connected in parallel with one another; and
    an overcurrent detection/prevention circuit for detecting and adding together output currents of the plurality of DC/DC converters and controlling the plurality of DC/DC converters individually so that a sum of the output currents does not exceed a predetermined level of current,
    wherein the individual output currents are added together and converted to voltage for outputting by means of an operational amplifier so as to represent the sum of the output currents.

3. A multiphase DC/DC converter, comprising
    a plurality of DC/DC converters whose outputs are connected in parallel with one another; and
    an overcurrent detection/prevention circuit for detecting and adding together output currents of the plurality of DC/DC converters and controlling the plurality of DC/DC converters individually so that a sum of the output currents does not exceed a predetermined level of current,
wherein the overcurrent detection/prevention circuit comprises:
    a plurality of amplifiers for amplifying voltages obtained through current-to-voltage conversion of the individual output currents and outputting the amplified voltages,
    a plurality of input resistors having one ends thereof connected respectively to output terminals of the amplifiers and having other ends thereof connected together at a common node so that currents proportional to the individual output currents flow through the input resistors,
    an adder having an inverting input terminal thereof connected to the common node of the plurality of resistors, the adder outputting at an output terminal thereof a voltage proportional to a sum of input currents individually flowing through the plurality of input resistors, and a comparator for comparing the output voltage of the adder with a predetermined reference voltage, wherein when the output voltage of the adder, which is proportional to the sum of the individual output currents and which is fed to the comparator, is higher than the predetermined reference voltage, the comparator feeds the individual DC/DC converters with a signal for limiting currents to control the individual DC/DC converters so that the sum of the individual output currents does not exceed a predetermined level of current.

4. A multiphase DC/DC converter, comprising:

a plurality of DC/DC converters whose outputs are connected in parallel with one another, the plurality of DC/DC converters each having an overcurrent detection circuit so as to limit an output current thereof according to an output of the overcurrent detection circuit so that output currents of the individual DC/DC converters do not exceed individual preset currents; and an overcurrent detection/prevention circuit for detecting and adding together the individual output currents and controlling the plurality of converters individually so that a sum of the output currents does not exceed a predetermined level of current.

5. A multiphase DC/DC converter as claimed in claim 4, wherein the individual output currents are added together and converted to voltage for outputting by means of an operational amplifier so that the outputted voltage represents the sum of the output currents.

6. A multiphase DC/DC converter as claimed in claim 4, wherein the predetermined level of current for the sum of the output currents is greater than a sum of the individual preset currents for the individual DC/DC converters.

7. A multiphase DC/DC converter, comprising:

a plurality of DC/DC converters whose outputs are connected in parallel with one another, the plurality of DC/DC converters each having an overcurrent detection circuit so as to limit an output current thereof according to an output of the overcurrent detection circuit so that output currents of the individual DC/DC converters do not exceed individual preset currents; and an overcurrent detection/prevention circuit for detecting and adding together the individual output currents and controlling the plurality of DC/DC converters individually so that a sum of the output currents does not exceed a predetermined level of current, wherein the individual output currents are detected by detecting voltages obtained through current-to-voltage conversion thereof achieved by means of resistors connected respectively in output paths of the plurality of DC/DC converters.

8. A multiphase DC/DC converter, comprising:

a plurality of DC/DC converters whose outputs are connected in parallel with one another, the plurality of DC/DC converters each having an overcurrent detection circuit so as to limit an output current thereof according to an output of the overcurrent detection circuit so that output currents of the individual DC/DC converters do not exceed individual preset currents; and an overcurrent detection/prevention circuit for detecting and adding together the individual output currents and controlling the plurality of DC/DC converters individually so that a sum of the output currents does not exceed a predetermined level of current, wherein the overcurrent detection/prevention circuit comprises:

a plurality of amplifiers for amplifying voltages obtained through current-to-voltage conversion of the individual output currents and outputting the amplified voltages, a plurality of input resistors having one ends thereof connected respectively to output terminals of the amplifiers and having other ends thereof connected together at a common node so that currents proportional to the individual output currents flow through the input resistors;

an adder having an inverting input terminal thereof connected to the common node of the plurality of resistors, the adder outputting at an output terminal thereof a voltage proportional to a sum of input currents individually flowing through the plurality of input resistors, and a comparator for comparing the output voltage of the adder with a predetermined reference voltage, wherein when the output voltage of the adder, which is proportional to the sum of the individual output currents and which is fed to the comparator, is higher than the predetermined reference voltage, the comparator feeds the individual DC/DC converters with a signal for limiting currents to control the individual DC/DC converters so that the sum of the individual output currents does not exceed a predetermined level of current.

* * * * *